(12) United States Patent
Safranek

(10) Patent No.: US 12,423,108 B2
(45) Date of Patent: *Sep. 23, 2025

(54) DEVICES TRANSFERRING CACHE LINES, INCLUDING METADATA ON EXTERNAL LINKS

(71) Applicant: Ampere Computing LLC, Santa Clara, CA (US)

(72) Inventor: Robert James Safranek, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,603

(22) Filed: Dec. 19, 2023

(65) Prior Publication Data

US 2024/0134650 A1    Apr. 25, 2024

Related U.S. Application Data

(63) Continuation of application No. 17/841,850, filed on Jun. 16, 2022, now Pat. No. 11,880,686.

(51) Int. Cl.
*G06F 15/173* (2006.01)
*G06F 9/38* (2018.01)
*G06F 21/62* (2013.01)

(52) U.S. Cl.
CPC .......... *G06F 9/3816* (2013.01); *G06F 9/3836* (2013.01); *G06F 9/3877* (2013.01)

(58) Field of Classification Search
None
See application file for complete search history.

(56) References Cited

U.S. PATENT DOCUMENTS

| 6,633,576 B1 | 10/2003 | Melaragni et al. |
| 7,062,609 B1 | 6/2006 | Trehus et al. |
| 7,356,039 B1 | 4/2008 | DiMambro |

(Continued)

OTHER PUBLICATIONS

Arm Limited, "Arm® Architecture Reference Manual for A-profile architecture," Arm DDI 04871.a, Aug. 2022, 11,952 pages.

(Continued)

*Primary Examiner* — Hyun Nam
(74) *Attorney, Agent, or Firm* — Withrow & Terranova, PLLC

(57) ABSTRACT

In a processing system, a conversion circuit coupled to a system bus generates a flow control unit (FLIT) and provides the FLIT to a link interface circuit for transmission over an external link. The external link may be a peripheral component interface (PCI) express (PCIe) link coupled to an external device comprising a cache or memory. The conversion circuit generates the FLIT, including write information based on the write instruction, metadata associated with at least one cache line, and cache line chunks, including bytes of a cache line. The cache line chunks may be chunks of one of the at least one cache line. Including the metadata in the FLIT avoids separately transmitting the at least one cache line and the metadata over the external link, which improves performance compared to generating separate transmissions. In some examples, the FLIT corresponds to a compute express link (CXL) protocol FLIT.

20 Claims, 11 Drawing Sheets

(56) References Cited

U.S. PATENT DOCUMENTS

| | | |
|---|---|---|
| 11,880,686 B2 | 1/2024 | Safranek |
| 2010/0161846 A1* | 6/2010 | Flachs .................. G06F 9/3877 |
| | | 710/22 |
| 2012/0198173 A1* | 8/2012 | Xu ...................... G06F 12/0813 |
| | | 711/E12.017 |
| 2012/0272011 A1 | 10/2012 | Carrie et al. |
| 2014/0033203 A1* | 1/2014 | Dogon .................. G06F 9/3001 |
| | | 718/100 |
| 2014/0112339 A1 | 4/2014 | Safranek et al. |
| 2015/0135182 A1* | 5/2015 | Liland .................. G06F 9/3888 |
| | | 718/102 |
| 2016/0117129 A1* | 4/2016 | Shrader ................ G06F 3/0604 |
| | | 711/105 |
| 2016/0344629 A1 | 11/2016 | Gray |
| 2017/0171095 A1 | 6/2017 | Prasadh et al. |
| 2018/0095921 A1* | 4/2018 | Lambrecht .......... G06F 13/1678 |
| 2020/0301597 A1 | 9/2020 | Surti et al. |
| 2022/0407841 A1* | 12/2022 | Karpowicz ......... H04L 63/0263 |
| 2023/0409332 A1* | 12/2023 | Safranek ............. G06F 9/3877 |
| 2025/0112071 A1* | 4/2025 | Choi ................. H01L 21/67389 |

OTHER PUBLICATIONS

CXL, Compute Express Link™ (CXL™), Revision 2.0, Version 1.0, Oct. 2020, 628 pages.
PCI-SIG, "PCI Express Base Specification," Revision 4.0, Version 0.3, Feb. 2014, 1053 pages.
Notice of Allowance for U.S. Appl. No. 17/841,850, mailed Sep. 15, 2023, 10 pages.

\* cited by examiner

DEVICES TRANSFERRING CACHE LINES, INCLUDING METADATA ON EXTERNAL LINKS

RELATED APPLICATION

The present application is a continuation of and claims priority to U.S. patent application Ser. No. 17/841,850, filed on Jun. 16, 2022, entitled "DEVICES TRANSFERRING CACHE LINES, INCLUDING METADATA ON EXTERNAL LINKS," which is hereby incorporated herein by reference in its entirety.

BACKGROUND

I. Field of the Disclosure

The technology of the disclosure relates generally to data storage in processing systems and, more particularly, to accessing caches and memory external to a processor device.

II. Background

Processing systems include processors and accelerators that execute instructions that can modify existing data and/or generate new data. A processor can access data stored in an external memory for processing. In case the data might be needed again, a copy of data may be stored closer to the processor in a cache to avoid the latency of a read operation to the external memory. The data may also be stored in a shared cache of the processing system, or a copy may be stored in a cache of another accelerator or processor in a multi-processor processing system. When shared data has been modified, it is important to maintain data coherency so that all processors and accelerators that may access the data are operating on a same version. For example, data modified by a processor may need to be copied from one cache to another or written to an external memory where it can be accessed by another processor. When modified data in a cache is written back to an external memory, unmodified copies of the data (e.g., in other caches) may be updated or simply invalidated, such that a processor needing the modified data will re-access the external memory. Maintaining data coherency in a processing system can include many memory operations for transferring cache lines. Delays in cache line transfers can slow down performance of the processing system.

SUMMARY OF THE DISCLOSURE

Aspects disclosed in the detailed description include devices transferring cache lines, including metadata on external links. Related methods are also disclosed. In a processing system, devices such as processors and accelerator devices share data cache lines, which are transferred between devices over external links. A write operation initiated by a device includes a write instruction, at least one cache line, and metadata associated with the at least one cache line transmitted on a system bus. A conversion circuit coupled to the system bus generates a flow control unit (FLIT) and provides the FLIT to a link interface circuit for transmission over an external link. For example, the external link may be a peripheral component interface (PCI) express (PCIe) link coupled to an external device comprising a cache or memory. In an exemplary aspect, the FLIT includes write information based on the write instruction, the metadata associated with the at least one cache line, and cache line chunks, which include bytes of a cache line. In some examples, the cache line chunks are chunks of one of the at least one cache line. The metadata is included in the FLIT to avoid separately transmitting the at least one cache line and the metadata over the external link. Including the metadata in a FLIT in a same transmission improves performance compared to generating separate transmissions. In some examples, the FLIT corresponds to a compute express link (CXL) protocol FLIT.

In this regard, in exemplary aspects disclosed herein, a conversion circuit is disclosed. The conversion circuit includes a first interface configured to couple to a device and a second interface configured to couple to a link interface circuit, wherein the conversion circuit is configured to receive an instruction and at least one cache line on the first interface and in response to the instruction, provide a flow control unit (FLIT) to the second interface. The FLIT includes a first header slot comprising information of the at least one first cache line, a first metadata slot comprising metadata associated with the at least one first cache line, and at least two slots comprising bytes of the at least one first cache line.

In another exemplary aspect, a method in a conversion circuit for providing a FLIT to a link interface circuit in response to an instruction received on a first interface is disclosed. The method includes receiving the instruction comprising a write instruction and at least a first cache line and generating, on a second interface coupled to the link interface circuit, a FLIT comprising a first header slot comprising information of the at least one first cache line, a first metadata slot comprising metadata associated with the at least one first cache line and at least two slots comprising bytes of the at least one first cache line.

DETAILED DESCRIPTION

Figure 1:
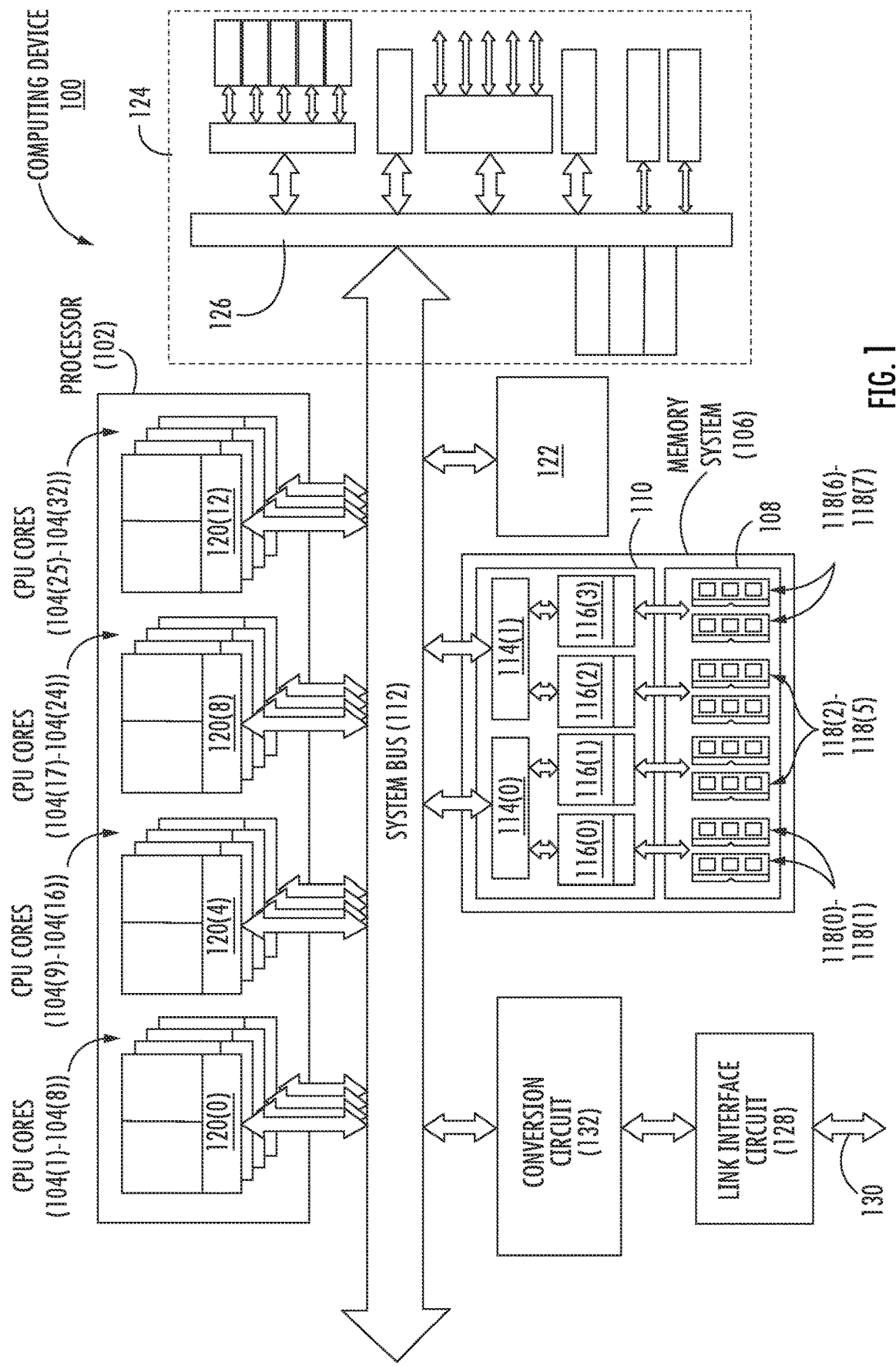
FIG. 1 is a block diagram of an exemplary computing device that includes a processor with a plurality of central processing unit (CPU) cores, peripheral devices, caches, and at least one link interface circuit coupled via a system bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include devices transferring cache lines, including metadata on external links. Related methods are also disclosed. In a processing system, devices such as processors and accelerator devices share data cache lines, which are transferred between devices over external links. A write operation initiated by a device includes a write instruction, at least one cache line, and metadata associated with the at least one cache line transmitted on a system bus. A conversion circuit coupled to the system bus generates a flow control unit (FLIT) and provides the FLIT to a link interface circuit for transmission over an external link. For example, the external link may be a peripheral component interface (PCI) express (PCIe) link coupled to an external device comprising a cache or memory. In an exemplary aspect, the FLIT includes write information based on the write instruction, the metadata associated with the at least one cache line, and cache line chunks, which include bytes of a cache line. In some examples, the cache line chunks are chunks of one of the at least one cache line. The metadata is included in the FLIT to avoid separately transmitting the at least one cache line and the metadata over the external link. Including the metadata in a FLIT in a same transmission improves performance compared to generating separate transmissions. In some examples, the FLIT corresponds to a compute express link (CXL) protocol FLIT.

Figure 2:
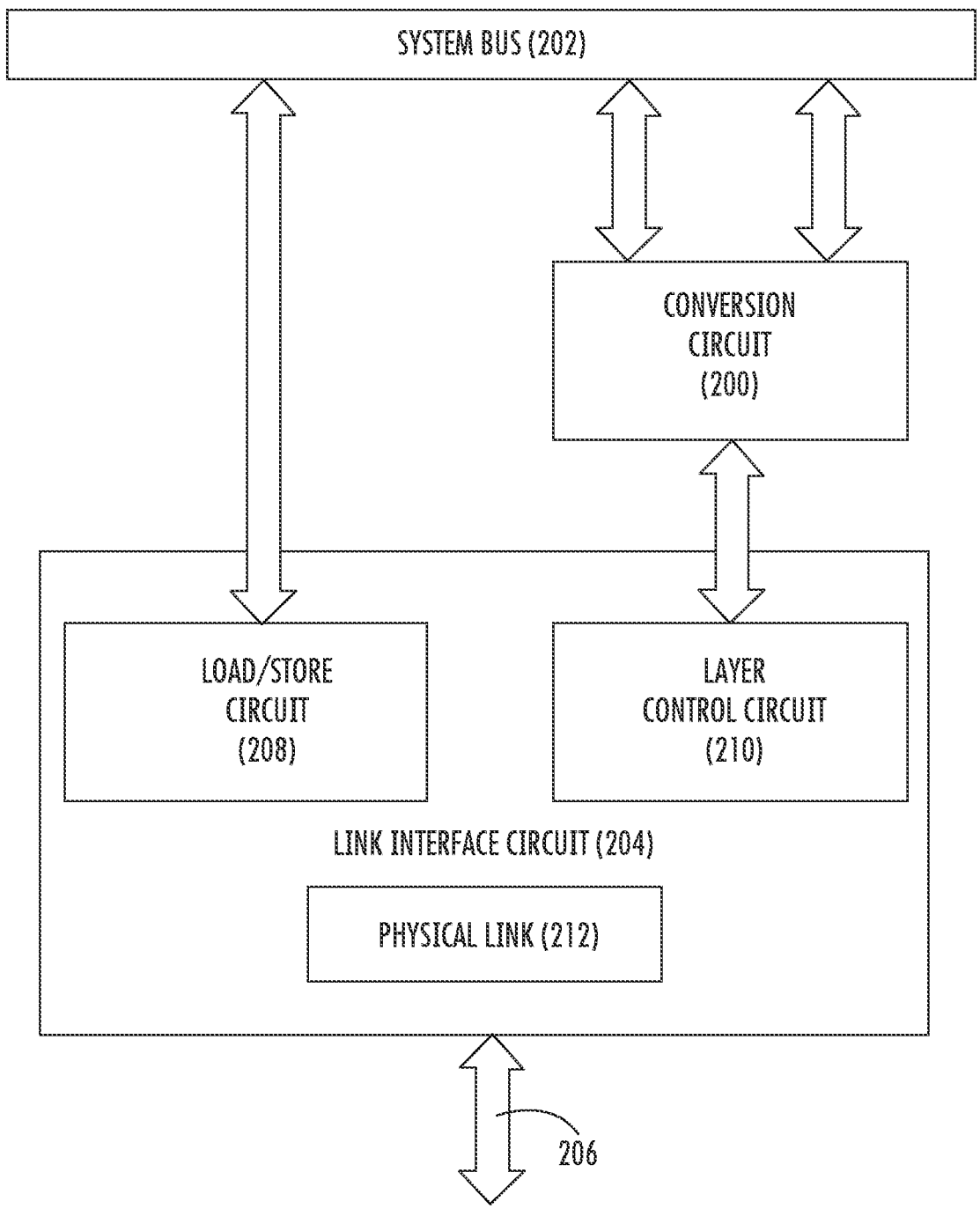
FIG. 2 is a block diagram of a conversion circuit coupled to a system bus and a link interface circuit in a computing device, as shown in FIG. 1, to generate flow control units (FLITs), including at least one cache line and metadata associated with the at least one cache line to avoid separate transmissions on the external link comprising the at least one cache line and the metadata.

Before discussing an example of a conversion circuit configured to generate flow control units (FLITs) including at least one cache line and associated metadata to avoid separate transmissions, as shown in FIG. 2, a computing device that includes the exemplary conversion circuit is first discussed with reference to FIG. 1.

In this regard, FIG. 1 is a block diagram of an exemplary computing device 100 that includes a processor 102 that includes a plurality of central processing unit (CPU) cores 104(1)-104(32) and a memory system 106 for storing data to be accessed by the CPU cores 104(1)-104(32). As discussed in more detail below, the memory system 106 includes a main memory 108 accessed by a memory controller 110 coupled to a system bus 112. The system bus 112 may also be referred to as a coherent fabric bus. The memory controller 110 includes memory buffers 114(0) and 114(1) and DRAM controllers 116(0)-116(3) to access a series of memory modules 118(0)-118(7). The computing device 100 includes a cache memory hierarchy that stores data in the main memory 108. Pairs of the CPU cores 104(1)-104(32) each share one of the private level 2 cache memories 120(0)-120(15) as part of the cache memory hierarchy. The private level 2 cache memories 120(0)-120(15) store copies of data for quick access to the CPU cores 104(1)-104(32). In a memory write access operation, a CPU core 104(1)-104(32) can write modified data to its private, shared level 2 cache memory 120(0)-120(15). If a cache entry is evicted from the level 2 cache memory 120(0)-120(15) to make room for a new cache line data, the cache line in the cache entry is communicated over the system bus 112 to be written to a system level 3 cache memory 122.

The system bus 112 connects the processor 102 to other external peripheral resources 124 coupled to an IO interface 126. The system bus 112 is also coupled to a link interface circuit 128, which may be coupled to an external link 130, which is further coupled to an external device (not shown), such as a memory or an accelerator comprising a cache. Accelerators and other external devices may include internal caches storing copies of data that is also stored in the processor 102. Alternatively, accelerators may operate on data received from the processor 102 and return modified data back to the processor 102. The external link 130 may be a peripheral component interface (PCI) express (PCIe) compatible interface.

The computing device 100 further includes a conversion circuit 132 for converting between a first communication format employed on the system bus 112 and a protocol employed by the link interface circuit 128 in response to memory instructions received on the system bus 112. The conversion circuit 132 performs a conversion in the reverse direction when responses bound for the computing device 100 are received from external devices. In some examples, the computing device 100 may employ compute express link (CXL) protocols to maintain data coherence with external devices. In such examples, the conversion circuit 132 generates FLITs according to the CXL protocols in response to receiving memory instructions on the system bus 112.

FIG. 2 is a block diagram of a conversion circuit 200 coupled between the system bus 202 and a link interface circuit 204, corresponding to the system bus 112 and the link interface circuit 128 in the computing device 100 in FIG. 1. The link interface circuit 204 is coupled to an external link 206 and controls communication on the external link 206. The link interface circuit 204 includes a load/store circuit 208 to manage initialization, link-up, device discovery and enumeration, and register access, for example. In this regard, the link interface circuit 204 may couple directly to the system bus 202. The link interface circuit 204 also includes layer control circuit 210, which implements the transaction layers and link layers for protocols used on the external link 206 to access external caches and memories. The link interface circuit 204 may further include a physical link 212. For example, the external link 206 may be a PCIe compatible link. In such an example, the load/store circuit 208 and the layer control circuit 210 may implement compute express link (CXL) protocols (e.g., CXL.io, CXL.mem, and CXL.cache).

The conversion circuit 200 couples to the system bus 202 and to the link interface circuit 204 to provide conversion between a communication format employed on the system bus 202 and the protocols (e.g., CXL.mem and CXL.cache) employed on the external link 206. Communication on the system bus 202 includes instructions and data transferred between entities coupled to the system bus 202. As an example, the conversion circuit 200 receives memory access instructions for accessing cache lines in an external device. The conversion circuit 200 converts the memory access instructions to FLITs that are transmitted over the external link 206. Memory access instructions include write instructions and read instructions. In conjunction with receiving a write instruction on the system bus 202, the conversion circuit 200 also receives data to be written, which may be at least one cache line to be written to an external device on the external link 206. In addition, the conversion circuit 200 may receive metadata associated with the at least one cache line.

In response to receiving a write instruction, at least one cache line, and metadata associated with the at least one cache line on the system bus, the conversion circuit 200 is configured to provide a FLIT to the link interface circuit 204 for transmission on the external link 206. The FLIT generated by the conversion circuit 200 includes write instructions, the at least one cache line, and the metadata associated with the at least one cache line. An exemplary FLIT that includes the metadata and the at least one cache line in a same transmission is an alternative to sending a first transmission including the at least one cache line and a second transmission including the metadata. Formats of the FLITs generated by the conversion circuit 200 in response to a write instruction and a read instruction are illustrated in FIG. 3.

Figure 3:
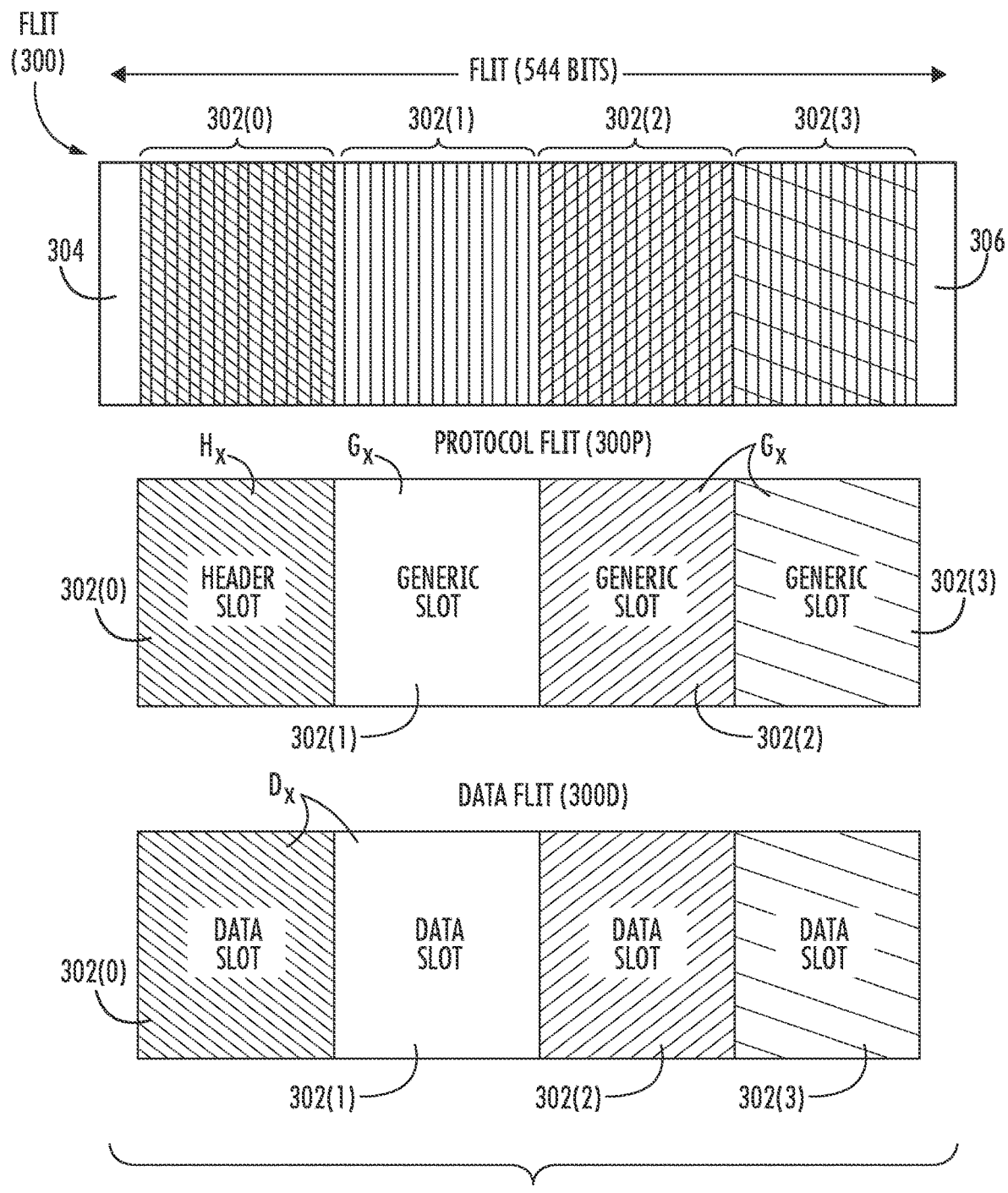
FIG. 3 illustrates an organization, by the conversion circuit in FIG. 2, of bytes within slots and slots within protocol FLITs and data FLITs of a first FLIT size.

FIG. 3 illustrates an organization of flow control units (FLITs) 300 of a first FLIT size employed for communication by the link interface circuit 204 in FIG. 2. The FLITs 300 can be employed for transmitting data of any type, e.g., organized in cache lines, on the external link 206 in FIG. 2. FLITs 300 are generated in response to a memory access instruction (e.g., read or write) to an external device. In one non-limiting example, each conventional FLIT 300 has a fixed size of sixty-eight (68) bytes (i.e., 544 bits), including four (4) 16-byte slots 302(0)-302(3) preceded by a two-byte protocol identifier 304 and followed by a two-byte error detection code 306 (e.g., circular redundancy check "CRC" 306). The conventional FLITs 300 are in the format of protocol FLITs 300P and data FLITs 300D, as shown in FIG. 3.

A sequence of the conventional FLITs 300 starts with a protocol FLIT 300P and may include one or more data FLITs 300D. In a protocol FLIT 300P, the first slot 302(0) contains a header "chunk" Hx, which is control information (e.g., instruction type, organization, and size) for data being transferred in the slots 302(1)-302(3). In this regard, the first slot 302(0) is also referred to as a "header slot," and the subsequent slots 302(1)-302(3) are referred to herein as "generic slots" because their content may vary depending on the instruction and data in the header chunk Hx. The header chunk Hx in the slot 302(0) may be one of several different formats that are defined for different transaction types. The content of one of the generic slots 302(1)-302(3) may be referred to as a generic chunk Gx. Information in the header chunk Hx may indicate the number and types of data FLITs 300D to follow the protocol flit 300P in a sequence. The slots 302(0)-302(3) in the data FLITs 300D may be referred to as data slots 302(0)-302(3) because they contain data chunks Dx. In a memory read or write operation, the data chunks Dx may each be a cache line chunk (e.g., 16 bytes) of a cache line. The generic chunks Gx in the generic slots 302(1)-302(3) in the protocol FLIT 300P may be data chunks Dx of a first cache line.

Figure 4:
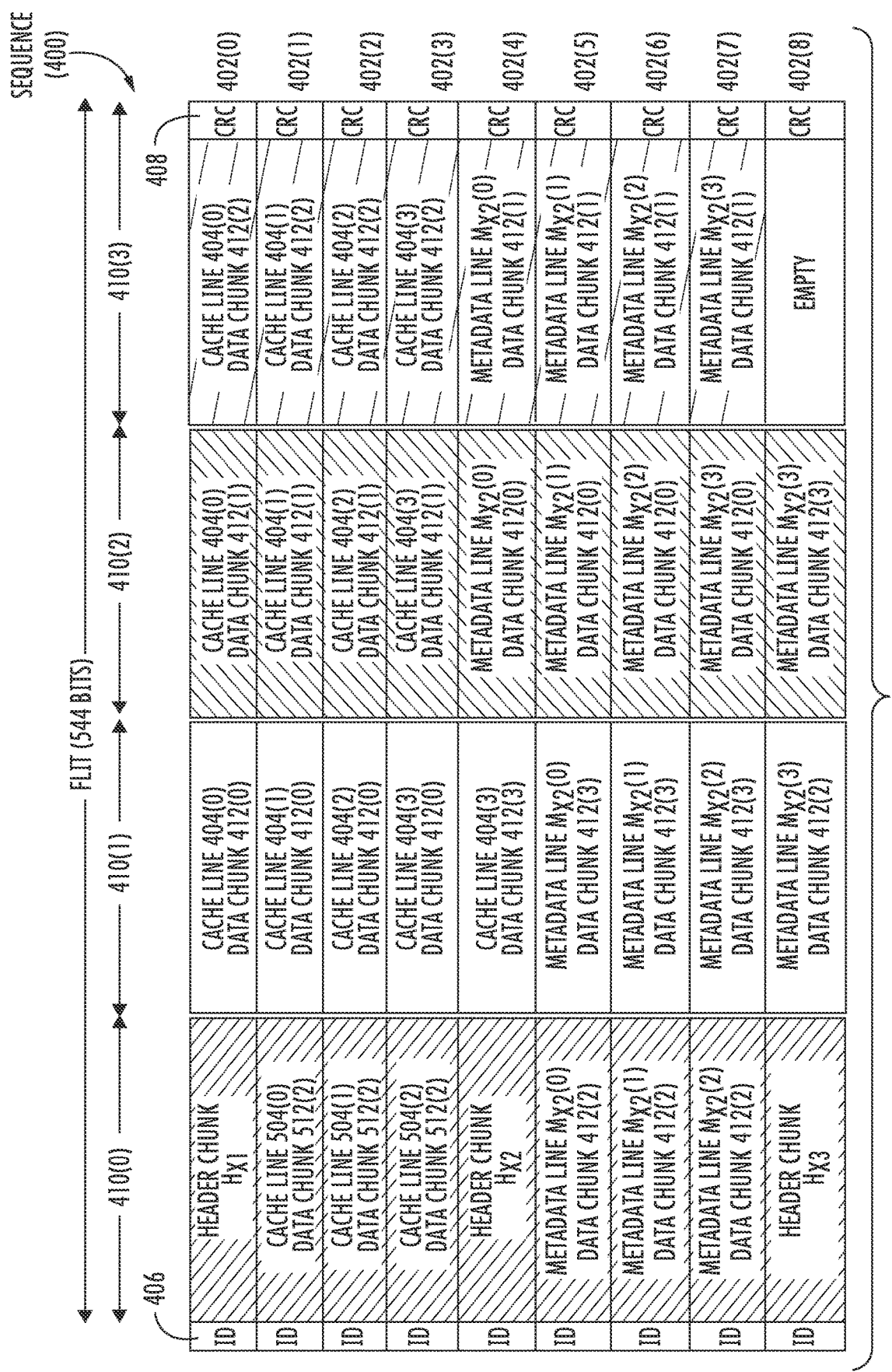
FIG. 4 illustrates sequences of FLITs, including a conventional FLIT employed in a read operation of data and metadata over the external link in FIG. 1.

FIG. 4 illustrates a sequence 400 of conventional FLITs 402(0)-402(8) for transferring cache lines 404(0)-404(3) (e.g., 64 bytes per cache line) and metadata lines $M_{X2}(0)$-$M_{X2}(3)$ associated with the cache lines 404(0)-404(3) in response to a first read instruction. Each of the FLITs 402(0)-402(8) are organized, as shown in FIG. 3, to include a prefix protocol identifier 406, a suffix error protection code (e.g., "CRC") 408, and slots 410(0)-410(3). In this example, the protocol identifier 406 is two bytes, the error protection code 408 is two bytes, and each of the slots 410(0)-410(3) are 16 bytes, but these field sizes are merely examples.

The FLITs 402(0), 402(4), and 402(8) in FIG. 4 are each in the format of the protocol FLIT 300P in FIG. 3, with the header slot 410(0) and generic slots 410(1)-410(3). A header chunk $H_{X1}$ in the header slot 410(0) of the protocol FLIT 402(0) contains information indicating that the generic slots 410(1)-410(3) contain data chunks 412(0)-412(2) of the first cache line 404(0). Information in the header chunk $H_{X1}$ may also indicate that the FLITs 402(1)-402(3) are in the format of the data FLITs 300D in FIG. 3. The FLIT 402(1) contains data chunk 412(3) of cache line 404(0) and data chunks 412(0)-412(2) of the cache lines 404(1). The FLIT 402(2) contains data chunk 412(3) of cache line 404(1) and data chunks 412(0)-412(2) of the cache line 404(2). The FLIT 402(3) contains data chunk 412(3) of cache line 404(2) and data chunks 412(0)-412(2) of the cache lines 404(3). The only remaining portion of the cache lines 404(0)-404(3) is the data chunk 412(3) of cache line 404(3).

In the conventional approach, even if the metadata associated with each one of the cache lines 404(0)-404(3) is only 4 bytes, an entire line (i.e., 16 bytes) including the metadata is transmitted for each cache line. Therefore, the metadata associated with the cache lines 404(0)-404(3) may be a total of 16 bytes but the metadata lines $M_{X2}(0)$-$M_{X2}(3)$ include a total of 64 bytes, organized as follows.

The FLIT 402(4) is a protocol FLIT including a header chunk $H_{X2}$, the last data chunk 412(3) of cache line 404(3), and the first data chunks 412(0)-412(1) of the $M_{X2}(0)$. Information in the header chunk $H_{X2}$ may also indicate that the FLITs 402(5)-402(7) are in the format of the data FLITs 300D in FIG. 3. In an organization similar to FLITs 402(1)-402(3), the FLITs 402(5)-402(7) contain the data chunks 412(2)-412(3) of the metadata lines $M_{X2}(0)$, the entire metadata lines $M_{X2}(2)$-$M_{X2}(3)$, and data chunks 412(0)-412(1) of the metadata line $M_{X2}(3)$. With only the data chunks 412(2)-412(3) of the metadata line $M_{X2}(3)$ remaining, there are not enough data chunks to form a data FLIT. Therefore, to complete the transfer, the protocol FLIT 402(8) includes the header chunk $H_{X3}$ and the data chunks 412(2)-412(3) of the metadata line $M_{X2}(3)$. The generic slot 410(3) remains empty in this situation. Thus, 9 FLITs are used needed in a read operation of four (4) cache lines and associated metadata in the conventional method.

Figure 5:
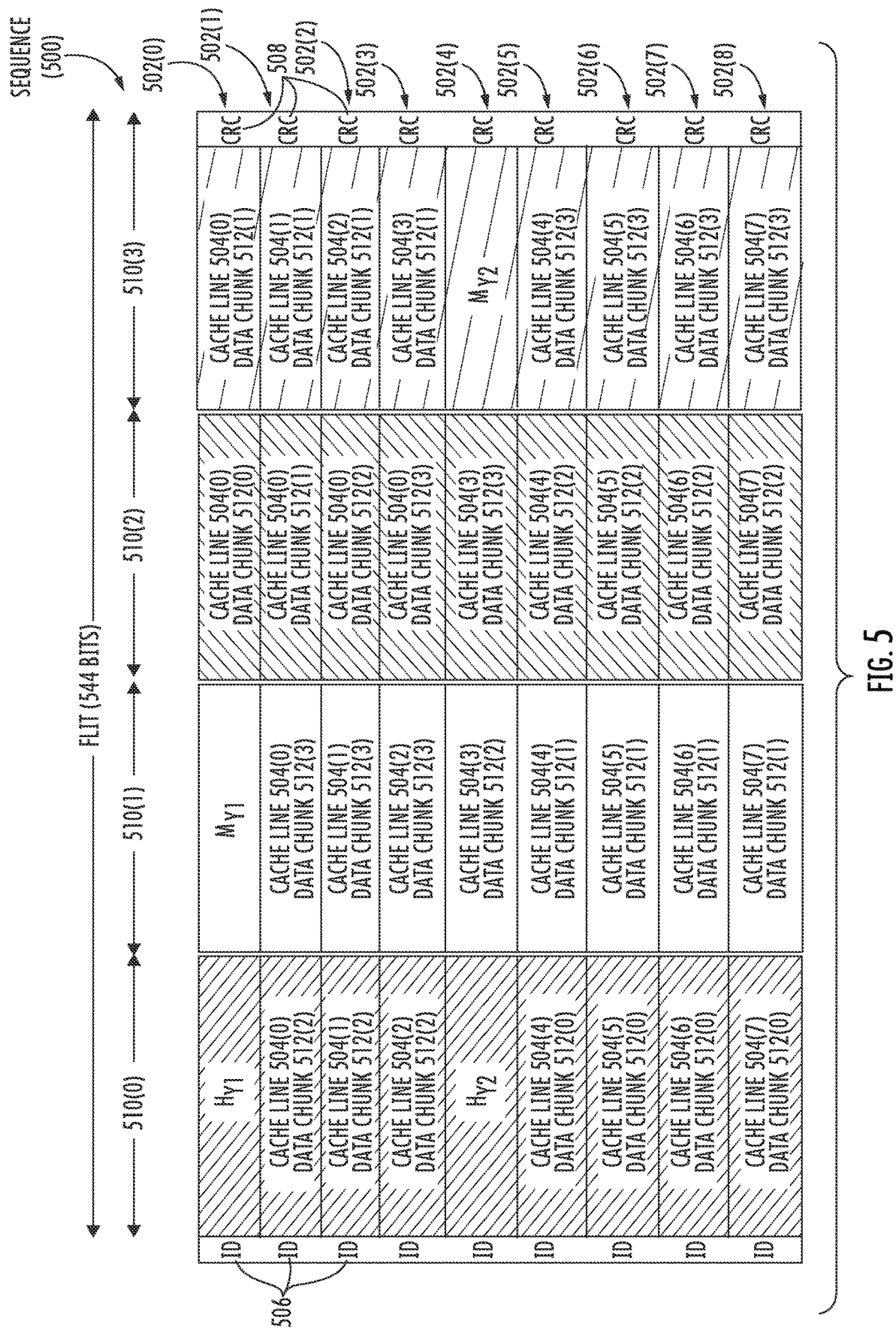
FIG. 5 illustrates sequences including exemplary FLITs generated by a conversion circuit to transfer at least one cache line and associated metadata in a same transmission in response to a write instruction from the system bus in FIG. 1.

As an alternative to the conventional protocol FLITs 300P, as shown in FIG. 3 and employed in the example in FIG. 4, FIG. 5 illustrates a sequence 500 of FLITs 502(0)-502(8) described with reference to features of FIG. 2. The conversion circuit 200 of FIG. 2, which is coupled to a system bus 202 in FIG. 2, generates the FLITs 502(0)-502(8) and provides them to a link interface circuit 204 for transmission over the external link 206 in response to a write instruction. The write instruction provides write information, at least one cache line, and associated metadata. FIG. 5 is an example in which the FLITs 502(0)-502(8) transfer cache lines 504(0)-504(7) and metadata chunks $M_{Y1}$-$M_{Y2}$ associated with the cache lines 504(0)-504(7) on the external link 206. Each of the FLITs 502(0)-502(8) includes a preceding protocol identifier 506, a following error protection code (e.g., CRC) 508, and slots 510(0)-510(3).

The conversion circuit 200 generates the exemplary protocol FLITs 502(0) and 502(4) that include the write information in a header chunk $H_{y1}$ in a header slot 510(0). One of the slots 510(1)-510(3) in the protocol FLITs 502(0) and 502(4) includes one of the metadata chunks $M_{y1}$-$M_{y2}$ associated with the cache lines 504(0)-504(7). The metadata chunks $M_{y1}$-$M_{y2}$ are included in the protocol FLITs 502(0) and 502(4) to avoid the need for transmitting one FLIT sequence over the external link 206 for the cache lines 504(0)-504(7) and another FLIT sequence for the metadata chunks $M_{y1}$-$M_{y2}$. Incorporating the cache lines 504(0)-504(7) and metadata chunks $M_{y1}$-$M_{y2}$ in the same sequence of FLITs 502(0)-502(8) reduces delays in completing the write instruction compared to using separate transmissions. In some examples, the FLIT corresponds to a compute express link (CXL) protocol FLIT.

The slots 510(1)-510(3) in the protocol FLITs 502(0) and 502(4) also include cache line chunks, which include multiple bytes of one of the cache lines 504(0)-504(7). The FLITs 502(0)-502(8) other than the protocol FLITs 502(0) and 502(4) are data FLITs 502(1)-502(3) and 502(5)-502(8) in which the slots 510(0)-510(3) are data slots 510(0)-510(3).

The conversion circuit 200 may receive the protocol identifier 506 and the error protection code 508 with a write instruction from the system bus. Alternatively, the conversion circuit 200 may generate or have generated (e.g., by other circuits) one or both of the protocol identifier 506 and the error protection code 508. The conversion circuit 200 generating the FLITs 502(0)-502(8) includes packing or organizing the preceding protocol identifier 506, the error protection code (e.g., CRC) 508, and the slots 510(1)-510(3) in the arrangements according to the types shown in FIG. 5. In this example, the protocol identifier 506 is two bytes, the error protection code 508 is two bytes, and each of the slots 510(0)-510(3) are 16 bytes, for a total FLIT size of 68 bytes; however, any of the protocol identifier 506, the error protection code 508, or the slots 510(0)-510(3) may have different sizes. The protocol FLIT 502(0) includes a header chunk $H_{y1}$ in a header slot 510(0) and the metadata chunk $M_{y1}$ in one of the generic slots 510(1)-510(3). The header slot 510(0) is the same size as the generic slots 510(1)-510(3), which are each 16 bytes.

The one of the generic slots 510(1)-510(3) that contains the metadata chunk $M_{y1}$ is also referred to as a "metadata slot." The metadata chunk $M_{y1}$ includes information associated with the cache lines 504(0)-504(3). For example, in the protocol FLIT 502(0), the generic slot 510(1) is also the metadata slot 510(1). In the protocol FLIT 502(4), the generic slot 510(3) is also the metadata slot 510(3) because it contains the metadata chunk $M_{y2}$, including information associated with the cache lines 504(4)-504(7). By employing the protocol FLITs 502(0) and 502(4), metadata can be incorporated into the sequence 500 of FLITs 502(0)-502(8) to avoid the need for transferring the metadata in a second sequence. The term "metadata" as used herein includes, but is not limited to, for example, valid bits, encryption bits, error correction bits, tag bits, or tracking bits associated with a corresponding cache line. The metadata chunks $M_{y1}$-$M_{y2}$ may include any type of information associated with the cache lines 504(0)-504(7).

Each of the cache lines 504(0)-504(7) includes data chunks 512(0)-512(3), which correspond in size to the sizes of the generic slots 510(1)-510(3) in the protocol FLITs 502(0) and 502(4) and also correspond to the sizes of the slots 510(0)-510(3) in the data FLITs 502(1)-502(3), 502(5)-502(8) shown in FIG. 5.

As noted, the header chunk $H_{y2}$, which is information associated with the cache lines 504(4)-504(7), is included in the header slot 510(0) of the protocol FLIT 502(4). The metadata chunk $M_{y2}$ is located in the metadata slot 510(3) in the protocol FLIT 502(4) rather than in the slot 510(1), as in protocol FLIT 502(0). The last two data chunks 512(2) and 512(3) of the cache line 504(3), are contained in the generic slots 510(1) and 510(2). That is, the last remaining chunks of partial cache line described by the header chunk $H_{y1}$ in the protocol FLIT 502(0) are inserted into the protocol FLIT 502(4) immediately following the header chunk $H_{y2}$. Then the metadata chunk $M_{y2}$ follows.

While the header chunk $H_{y1}$ in the protocol FLIT 502(0) in this example contains information about the cache lines 504(0)-504(3), in another example, the header chunk $H_{y1}$ could contain information indicating that fewer cache lines (e.g., 504(0) and 504(1)) are to be transferred, indicating a shorter sequence of FLITs. The header chunk $H_{y1}$ of the protocol FLIT 502(0) may contain information indicating that up to four cache lines 504(0)-504(3) and the associated metadata are to be transmitted.

Including the metadata chunks $M_{y1}$ and $M_{y2}$ in the protocol FLITs 502(0) and 502(4) creates a need for two additional data slots to transfer the data chunks 512(0)-512(3) of the cache lines 504(0)-504(7) compared to not transmitting the metadata chunks $M_{y1}$ and $M_{y2}$. However, including the metadata chunks $M_Y$ in the protocol FLITs 502(0), 502(4), etc., may not always cause an increase in the number of FLITs used to transfer cache lines. For example, comparing the sequences 400 and 500 in FIGS. 4 and 5, in an example in which only eight (8) cache lines 404(0)-404(7) are transmitted, a total of nine (9) FLITs 402(0)-402(8) would be transmitted using the conventional protocol FLITs 300P, and a total of nine (9) FLITs 502(0)-502(8) are transmitted using the exemplary FLITs 502(0) and 502(4) in FIG. 5. Using the conventional protocol FLITs in the sequence 400, the last two data chunks 412(2) and 412(3) of cache line 404(7), are contained in data slots 410(0) and 410(1), respectively, of FLIT 402(8) and data slots 410(2) and 410(3) would be unused. Whereas the last FLIT 502(8) in the sequence 500 includes the entire cache line 504(7) and no unused slots.

Figure 6:
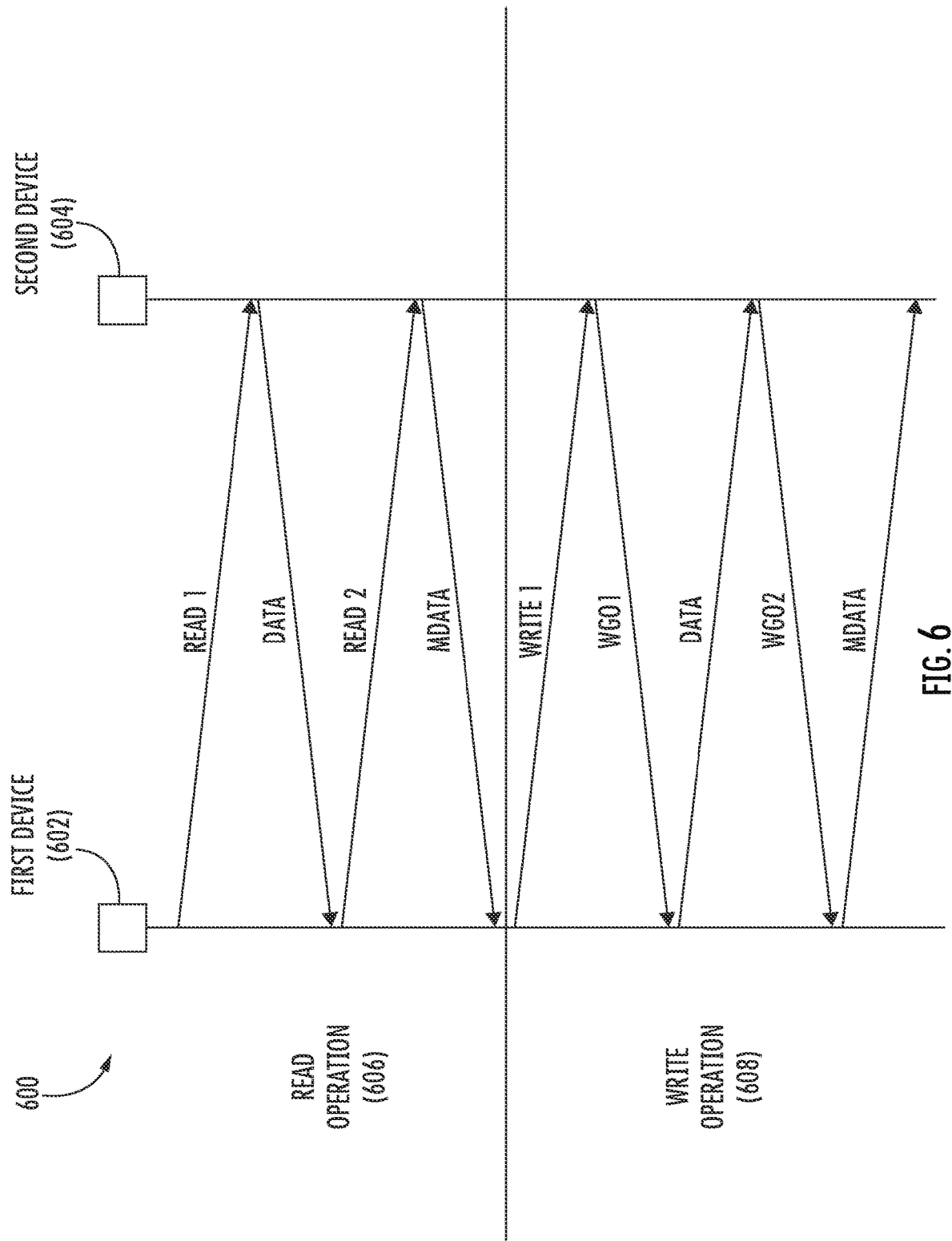
FIG. 6 is a high-level flow diagram of transactions between a device and an external device over the external link of FIG. 1, employing conventional FLITs in response to read operations and write operations for transferring at least one cache line and associated metadata.
Figure 7:
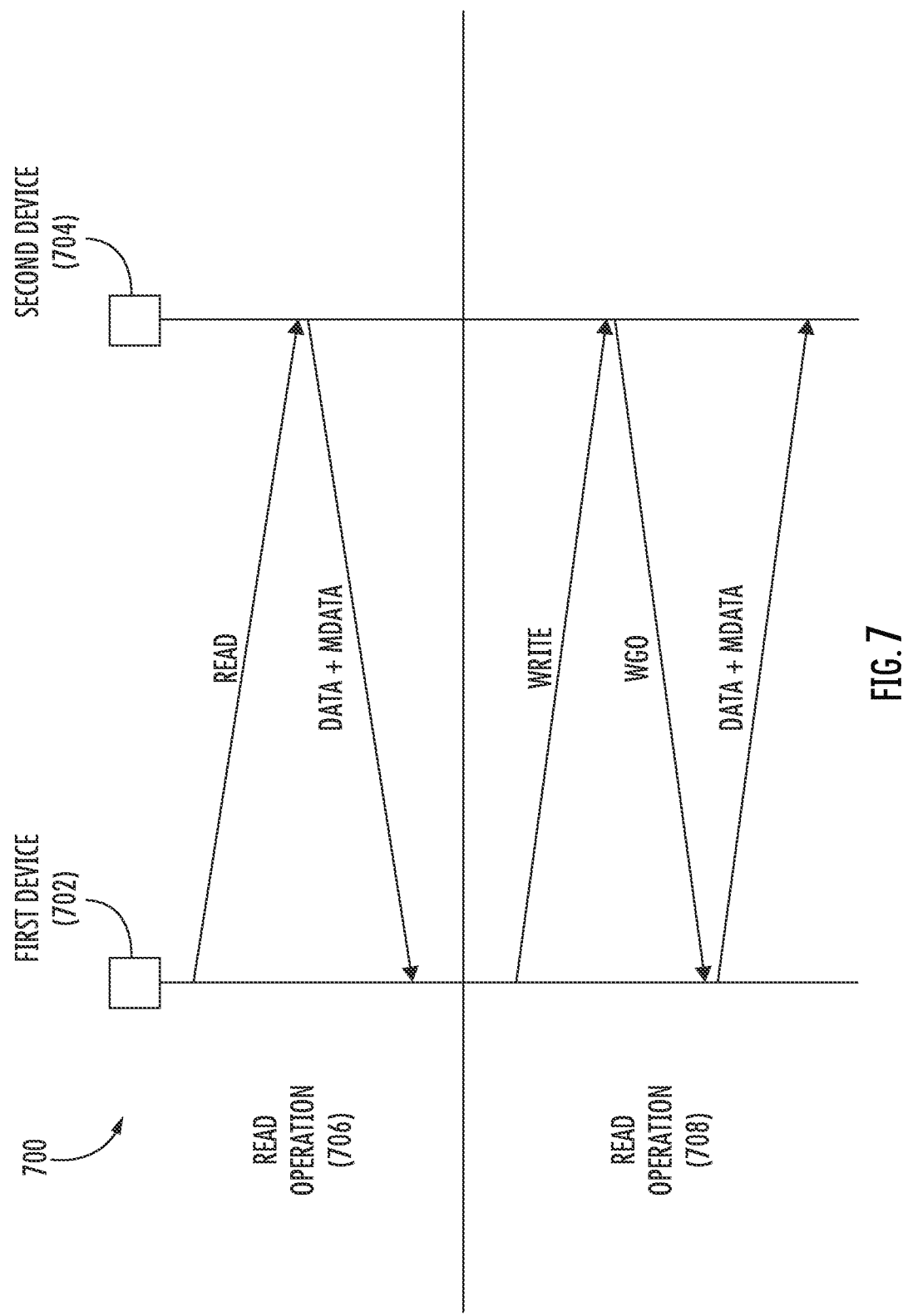
FIG. 7 is a high-level flow diagram of transactions between a device and an external device over the external link of FIG. 1, employing exemplary FLITs including at least one cache line and associated metadata in response to read operations and write operations.

Even if the number of FLITs in a sequence to transfer cache lines is increased, the exemplary FLITs shown in FIG. 5 make it possible to transfer the cache lines 504(0)-504(7) and the associated metadata chunks $M_{y1}$-$M_{y2}$ more efficiently than in FIG. 4. FIGS. 6 and 7 are provided to illustrate the different numbers of transactions needed across the external link 206 with and without the use of the exemplary protocol FLITs 502(0) and 502(4).

It should be noted that the sequence of FLITs 502(0)-502(8) also represents the format of FLITs that would be used in a sequence for receiving cache lines 504(0)-504(7) over the external link 206 from an external memory. First, in response to receiving a read instruction on the system bus 202 requesting the cache lines 504(0)-504(7) and the metadata chunks $M_{y1}$-$M_{y4}$, a protocol FLIT 502(0) including read information (e.g., a read request) would be sent to the external memory on the external link 206. In response to the read request, the FLITs 502(0)-502(8) shown in FIG. 5 indicate the format of FLITs returned on the external link 206. In the case of a read instruction, the header chunks $H_{y1}$-$H_{y2}$ would indicate that the cache lines 504(0)-504(7) are being returned.

The protocol FLIT 300P format shown above in FIG. 3 and employed in the example in FIG. 4 are compatible with a version of the CXL protocols in which each FLIT includes 68 bytes. The exemplary formats of the protocol FLITs 502(0) and 502(4) in FIG. 5 are modifications that may be able to be employed in the protocols CXL.mem and CXL.cache to increase efficiency of transmitting metadata.

FIGS. 6 and 7 are high-level flow diagrams 600 and 700 of transmissions over the external link 206 in FIG. 2 (e.g., a PCIe compatible physical link) provided for comparison and to illustrate a difference in a number of transactions in a system employing the exemplary conversion circuit 200 compared to a conventional system.

The diagram 600 in FIG. 6 shows transactions between a first device 602 and a second device 604 in a read operation 606 in response to a read instruction and a write operation 608 in response to a write instruction. The illustration in FIG. 6 is based on an example in which the conventional protocol FLIT format 300P shown in FIG. 3 is employed. Time progresses downward in the vertical direction in FIG. 6 but is not shown to scale. The arrows in FIG. 6 indicate a communication in a direction between the first device 602 and the second device 604.

In this example, in the read operation 606, the first device 602, initially receives a read instruction to read cache lines DATA and associated metadata MDATA. In response to a read instruction, the first device 602 transmits a first read request READ1 to the second device 604, to request DATA, which includes one or more cache lines. For example, the first device 602 may be the computing device 100 in FIG. 1 and the second device 604 may be an external memory device or an accelerator, including a cache (not shown). In response to the read request READ1, the second device 604 sends the requested DATA to the first device 602. Because protocol FLITs in the format of the protocol FLIT 300P are used in this example, the first device 602 then transmits a second read request READ2 to request the metadata MDATA associated with the DATA. The second device 604 responds by sending the metadata MDATA to the first device 602.

In the write operation 608, the first device 602 receives a write instruction, one or more cache lines DATA, and metadata MDATA. In response to the write instruction, to write the one or more cache lines DATA and the metadata MDATA associated with the DATA, the first device 602 transmits a write request WRITE to the second device 604. The second device 604 responds with a write approval WGO1, and the first device 602 transmits the cache lines DATA to the second device 604. The second device 604, then sends a second write approval WGO2 indicating to the first device 602 that the metadata MDATA can be transmitted to the second device 604. The first device 602 responds by sending the metadata MDATA to the second device 604.

The diagram 700 in FIG. 7 illustrates transactions between a first device 702 and a second device 704 in a read operation 706 in response to a read instruction and a write operation 708 in response to a write instruction. The illustration in FIG. 7 is based on an example in which protocol FLITs having the exemplary format of the protocol FLITs 502(0) and 502(4) in FIG. 5 are employed. As in FIG. 6, time progresses downward in the vertical direction in FIG. 7 but is not shown to scale.

The first device 702 receives a read instruction to read cache lines DATA and associated metadata MDATA. The first device 702 includes a conversion circuit (not shown) corresponding to the conversion circuit 200 in FIG. 2. In response to the read instruction, the first device 702 transmits a read request READ to the second device 704. The second device 704, also includes a conversion circuit corresponding to the conversion circuit 200. The second device 704 responds to the read request READ by transmitting to the first device 702, the DATA and the associated metadata MDATA in a series of FLITs corresponding to the FLITs 502(0)-502(8) in FIG. 5.

In response to the write instruction, the first device 702 transmits a write request WRITE to the second device 704. The second device 704 responds with a write approval WGO to the first device 702. In response to the write approval WGO, the first device 702 transmits, to the second device 704, the data DATA and metadata MDATA in a series of FLITs corresponding to the FLITs 502(0)-502(8) shown in FIG. 5.

Completing the read operation 606 and the write operation 608 in FIG. 6 requires more distinct transactions than are used in the read operation 706 and the write operation 708 in FIG. 7. Based on FIGS. 4 and 6, it can be seen that the number of distinct transactions required to complete data transfers, including cache lines and associated metadata with conventional FLITs, such as FLITs 402(0)-402(11) in FIG. 4, is greater than the number of transactions used in the conversion circuit 200 employing the FLITs 502(0)-502(8) in FIG. 5. In this regard, the conversion circuit 200 in FIG. 2 employs the FLITs 502(0)-502(8) to reduce a number of transactions required to transmit cache lines and associated metadata, which can significantly improve performance over an external link using conventional FLITs. In particular, the protocol FLITs (e.g., 502(0) and 502(4)), which incorporate metadata chunks $M_{Y1}$ and $M_{Y2}$, as illustrated in FIG. 5, enable devices communicating over an external link 206 to achieve read and write operations with fewer transmissions (e.g., sequences of FLITs) than when conventional protocol FLITs 300P are used.

Figure 8:
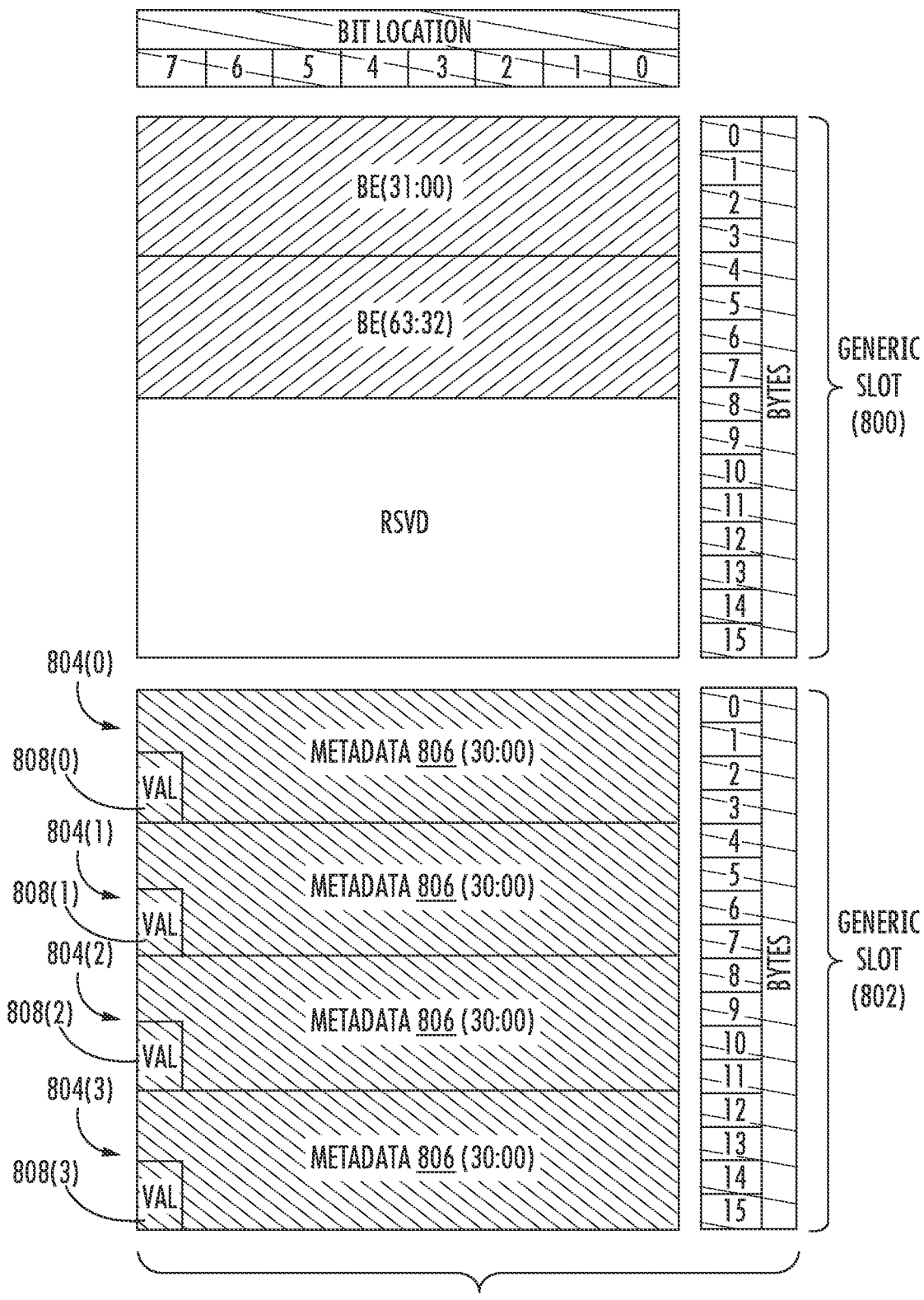
FIG. 8 illustrates an existing generic slot format for comparison to an exemplary generic slot format, including metadata fields and valid bits.

FIG. 8 is an illustration of a generic slot 800 of an existing format used to indicate byte enables and an exemplary generic slot 802 in a format including metadata fields 804(0)-804(3). The generic slot 800 can be used in a protocol FLIT in conjunction with a header slot for a partial or masked memory access operation. As discussed above, the header chunks $H_{Y1}$ and $H_{Y2}$ in the header slots in FLITs 502(0) and 502(4) can each provide information regarding up to 64 bytes, or four (4) cache lines of 16 bytes each, being transmitted in a sequence of the FLITs 502(0)-502(8). In another example, the header chunks $H_{Y1}$ and $H_{Y2}$ can further indicate that a read operation or write operation in which a generic slot 802(1) following the header slot in FLIT 502(0) includes byte enables BE (63:00). The byte enables BE (63:00) to occupy BIT LOCATIONS (7:0) of BYTES (7:0) of the generic slot 800, and each of the byte enables BE (63:00) to provide write control bits or read control bits controlling whether corresponding bytes in the 16 cache lines are to be read or written. BYTES (15:8) of the generic slot 800 are reserved and may be unused.

The generic slot 802 shows an alternative to the generic slot 800, which can contain the metadata fields 804(0)-804(3). The header chunk $H_{Y1}$ can, in one example, indicate that a following generic slot is of the format of the generic slot 802 and may further indicate whether the metadata fields 804(0)-804(3) are valid. In the example in FIG. 8, the metadata fields 804(0)-804(3) each include metadata bits 806(30:0). The metadata fields 804(0)-804(3) in this example also include valid bits 808(0)-808(3) to indicate whether the generic slot 802 includes valid metadata associated with data being transmitted.

Figure 9:
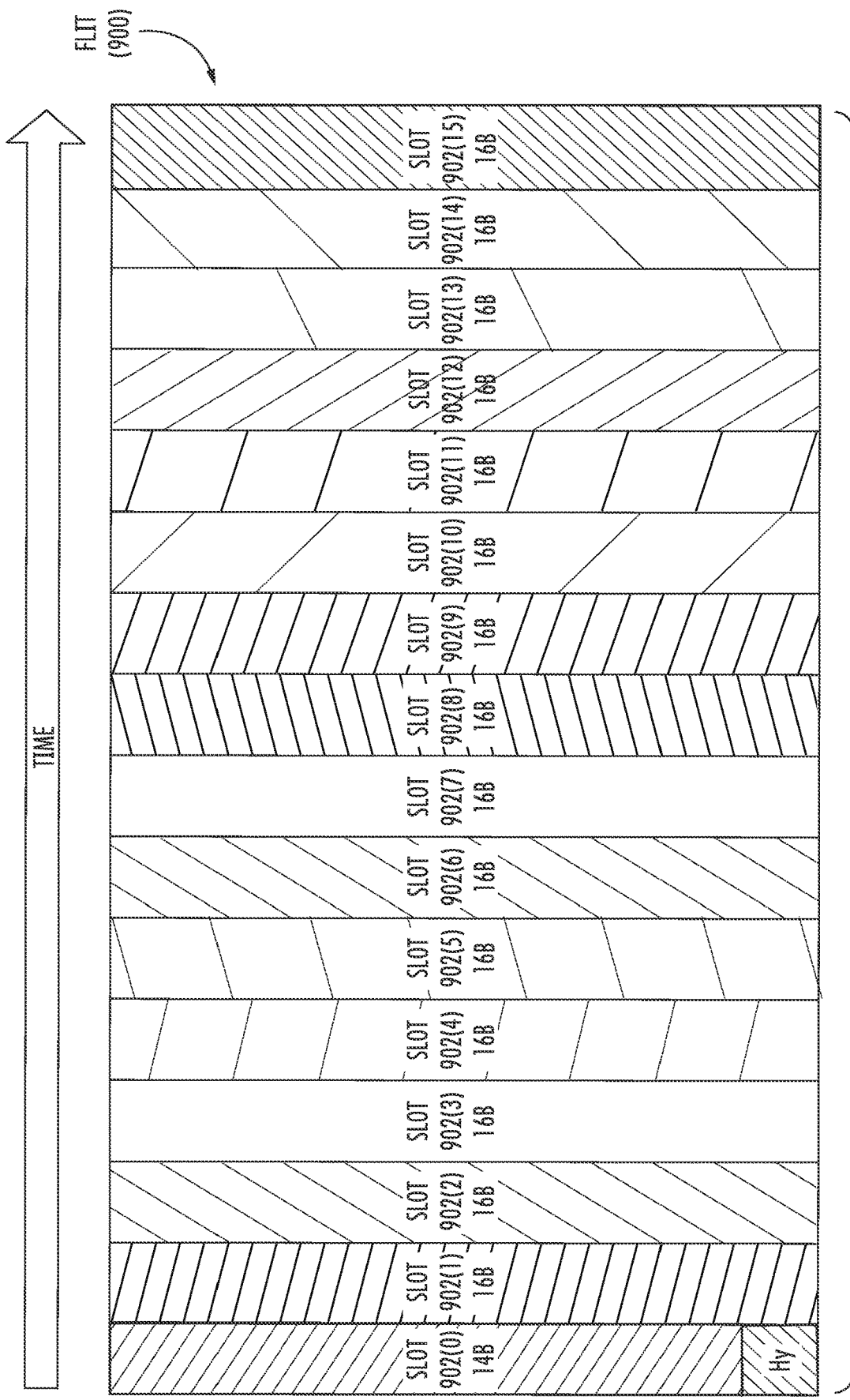
FIG. 9 illustrates FLITs of a second FLIT size employed for communication by the conversion circuit in FIG. 2.

FIG. 9 illustrates a FLIT 900 of a second size, including 16 slots 902(0)-902(15), each containing up to 16 bytes, generated by the conversion circuit in FIG. 2. A protocol FLIT in the size of the FLIT 900 includes a header chunk $H_Y$ in a header slot 902(0). The header chunk $H_Y$ can indicate that one of the generic slots 902(1)-902(15) includes a metadata chunk $M_Y$. Including a metadata chunk $M_Y$ in the FLIT 900 can transfer both data and metadata in one sequence to increase efficiency compared to separately transferring data and metadata.

Figure 10:
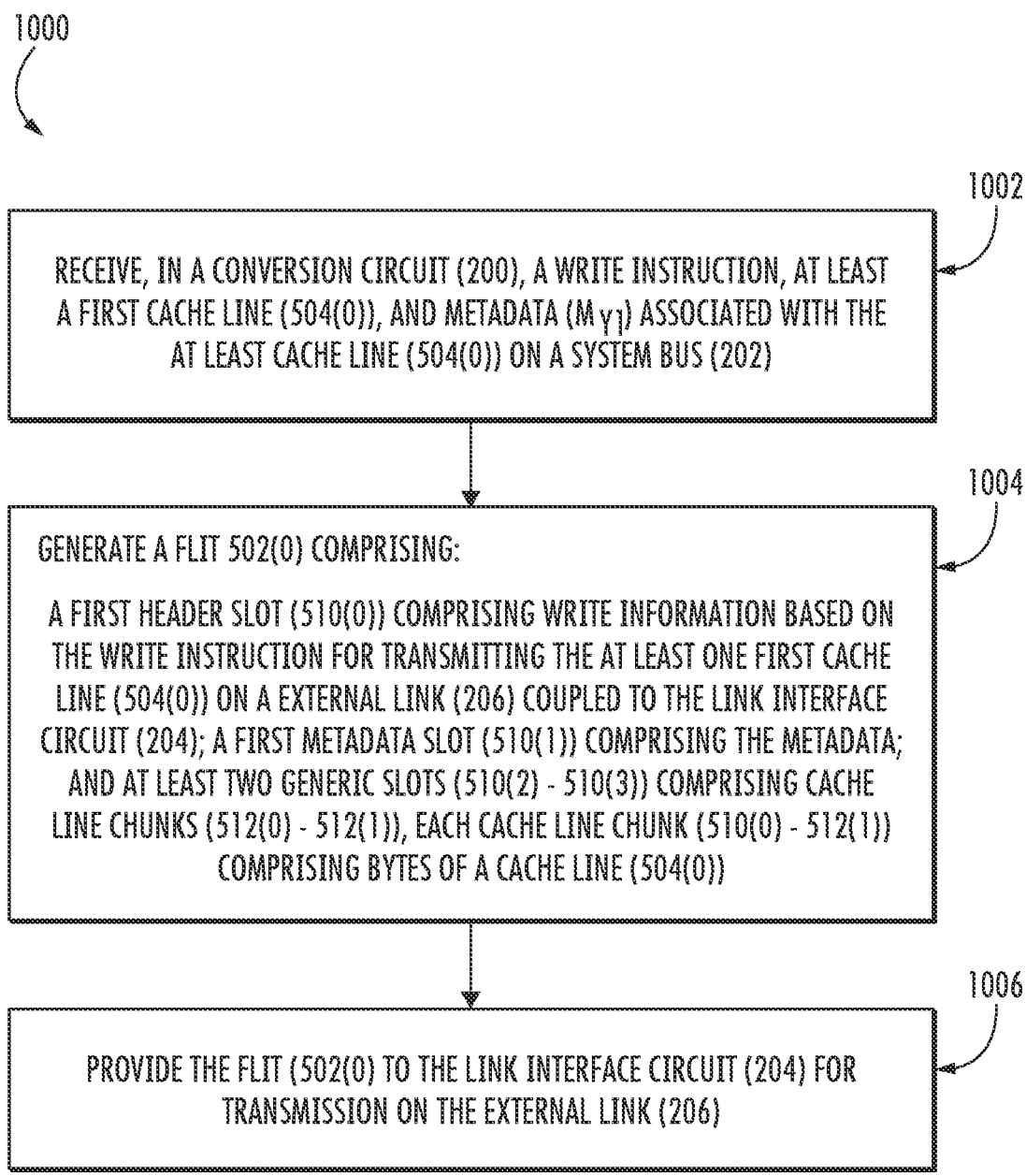
FIG. 10 is a flowchart illustrating a method of a conversion circuit providing, in response to receiving a write instruction, a FLIT to a link interface circuit of a device.

FIG. 10 is a flow chart illustrating a method 1000 in a device 100, of a conversion circuit 200 providing a flow control unit (FLIT) 502(0) to a link interface circuit 204 of a device 100. The method 1000 comprises receiving, in a conversion circuit 200, a write instruction, at least a first cache line 504(0), and metadata $M_{Y1}$ associated with the at least a first cache line 504(0) on a system bus 202 (block 1002). The method 1000 comprises generating a FLIT 502(0) comprising a first header slot 510(0) comprising write information based on the write instruction for transmitting the at least one first cache line 504(0) on an external link 206 coupled to the link interface circuit 204, a first metadata slot 510(1) comprising the metadata $M_{Y1}$; and at least two generic slots 510(2)-510(3) comprising cache line chunks 512(0)-512(1), each cache line chunk 512(0)-512(1), comprising bytes of a cache line 504(0) (block 1004). The method 1000 further comprises providing the FLIT 502(0) to the link interface circuit 204 for transmission on the external link 206 (block 1006).

Figure 11:
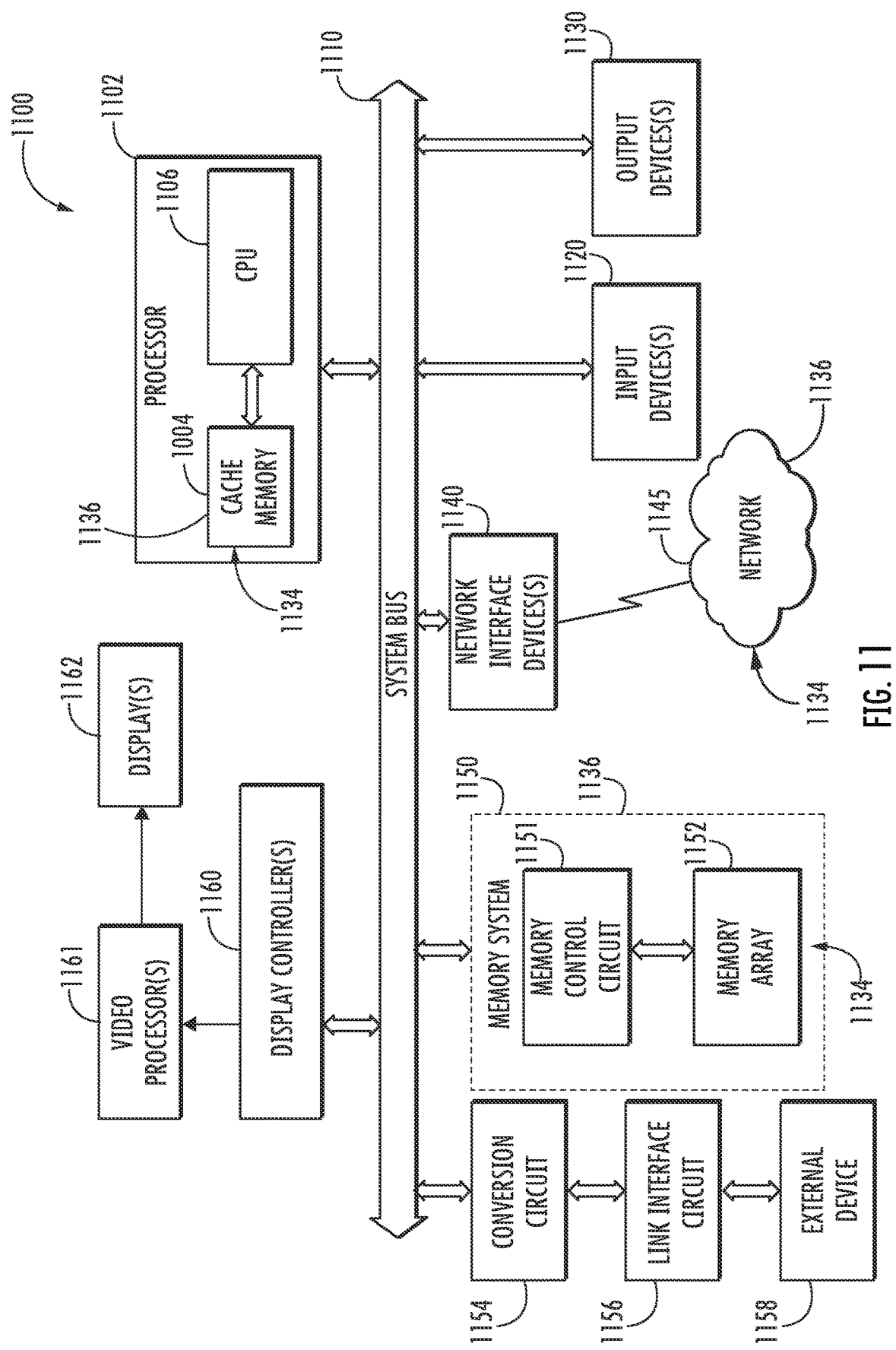
FIG. 11 is a block diagram of an exemplary computer system including a CPU that includes a plurality of CPU cores and peripheral devices, and other resources, including a conversion circuit coupled to a link interface circuit.

FIG. 11 illustrates an example of a processor-based system 1100 that includes conversion circuit 1154 coupled to external device 1158, the link interface circuit generating FLITs that can incorporate metadata with improved performance in memory access operations. In this example, the processor-based system 1100 includes a processor 1102, including a cache memory 1104 coupled to a CPU 1106. The processor 1102 corresponds to the processor 102 in FIG. 1. The processor 1102 is coupled to a system bus 1110 and can communicate with other devices by exchanging address, control, and data information over the system bus 1110. For example, the processor 1102 can communicate bus transaction requests to a memory control circuit 1151 in a memory system 1150. Although not illustrated in FIG. 11, multiple system buses 1110 could be provided; wherein each system bus 1110 constitutes a different fabric.

Other devices can be connected to the system bus 1110. As illustrated in FIG. 11, these devices can include one or more input devices 1120, one or more output devices 1130, one or more network interface devices 1140, and one or more display controllers 1160, as examples. Additionally, the system bus 1110 can couple to the conversion circuit 1154, which provides conversion of instructions from a protocol of the system bus 1110 to a format of the link interface circuit 1156. The link interface circuit 1156 implements transaction layer and link layer functions for a PCIe interface to the external device 1158. The input device(s) 1120 can include any type of input device, including, but not limited to, input keys, switches, voice processors, etc. The output device(s) 1130 can include any type of output device, including, but not limited to, audio, video, other visual indicators, etc. The network interface device(s) 1140 can be any device configured to allow an exchange of data to and from a network 1145. The network 1145 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1140 can be configured to support any type of communications protocol desired. The memory system 1150 can include the memory controller 1151 coupled to one or more memory array 1152.

The processor 1102 may also be configured to access the display controller(s) 1160 over the system bus 1110 to control information sent to one or more displays 1162. The display controller(s) 1160 sends information to the display(s) 1162 to be displayed via one or more video processors 1161, which process the information to be displayed into a format suitable for the display(s) 1162. The display(s) 1162 can include any type of display, including, but not limited to, a cathode ray tube (CRT), a liquid crystal display (LCD), a plasma display, and a light-emitting diode (LED) display, etc.

The processor-based system 1100 in FIG. 11 may include a set of instructions 1134 stored in the system memory 1150 and/or instruction cache memory 1104 as examples of non-transitory computer-readable medium 1136. The instructions 1134 may also reside, completely or at least partially, within the system memory 1150 and/or within the processor 1102 during their execution. The instructions 1134 may further be transmitted or received over the network 1145 via the network interface devices 1140, such that the network 1145 includes the non-transitory computer-readable medium 1136.

While the non-transitory computer-readable medium 1136 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The conversion circuit 1154, according to aspects disclosed herein, may be provided in or integrated into any processor-based device. Examples, without limitation, include a server, a computer, a portable computer, a desktop computer, a mobile computing device, a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality.

How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein and is to be accorded the widest scope consistent with the principles and novel features disclosed herein.

What is claimed is:

1. A conversion circuit comprising:
    a first interface configured to couple to a device; and
    a second interface configured to couple to a link interface circuit,
    wherein the conversion circuit is configured to:
        receive an instruction and at least one first cache line on the first interface; and
        in response to the instruction, provide a flow control unit (FLIT) to the second interface, the FLIT comprising:
            a first header slot comprising information of the at least one first cache line;
            a first metadata slot comprising metadata associated with the at least one first cache line; and
            at least two slots comprising bytes of the at least one first cache line.

2. The conversion circuit of claim 1, wherein the conversion circuit is further configured to receive the metadata associated with the at least one first cache line on the first interface.

3. The conversion circuit of claim 1, wherein each of the at least two slots of the FLIT comprises a cache line chunk comprising at least one of the bytes of the at least one first cache line.

4. The conversion circuit of claim 3, further configured to provide the FLIT comprising, sequentially:
    the first header slot comprising a first slot;
    the first metadata slot comprising a second slot; and
    the at least two slots comprising a third slot and a fourth slot,
    wherein each of the first header slot, the first metadata slot, and the at least two slots comprises a first number of bytes.

5. The conversion circuit of claim 4, wherein the cache line chunk in each of the at least two slots comprises the first number of bytes of a first cache line of the at least one first cache line.

6. The conversion circuit of claim 4, further configured to provide the FLIT comprising, in the at least two slots, a second cache line chunk of a second cache line of the at least one first cache line.

7. The conversion circuit of claim 6, wherein the conversion circuit is further configured to provide the FLIT comprising, in the at least two slots, a third cache line chunk of a third cache line of the at least one first cache line.

8. The conversion circuit of claim 1, wherein the conversion circuit is further configured to provide, sequentially, in the FLIT:
    the first header slot;
    a first plurality of the at least two slots, each comprising a cache line chunk of a cache line other than the at least one first cache line; and
    the first metadata slot.

9. The conversion circuit of claim 8, further configured to provide, sequentially, in the FLIT:
    a second plurality of the at least two slots, each comprising a cache line chunk comprising bytes of one of the at least one first cache line.

10. The conversion circuit of claim 1, further configured to provide a second FLIT comprising a plurality of data slots, each comprising a cache line chunk comprising bytes of one of the at least one first cache line.

11. The conversion circuit of claim 10, wherein the plurality of data slots each comprise a cache line chunk comprising bytes of a second one of the at least one first cache line.

12. The conversion circuit of claim 1, further configured to generate the FLIT comprising a compute express link (CXL) FLIT employed in a peripheral component interface (PCI) protocol.

13. The conversion circuit of claim 1, further configured to provide, in each metadata slot:
at least one metadata field corresponding to one of the at least one first cache line; and
a valid bit corresponding to the at least one metadata field and indicating whether metadata in the corresponding at least one metadata field is valid.

14. The conversion circuit of claim 1, wherein:
each of the first header slot, the first metadata slot, and the at least two slots comprise sixteen (16) bytes;
the at least two slots consist of two generic slots; and
the FLIT further comprises:
a two-byte protocol identifier; and
a two-byte error detection code.

15. The conversion circuit of claim 1, wherein:
each of the first header slot, the first metadata slot, and the at least two slots comprise sixteen (16) bytes;
the at least two slots comprise at least (12) slots; and
the FLIT further comprises:
a protocol identifier; and
an error detection field.

16. The conversion circuit of claim 1, wherein the conversion circuit is further configured to:
receive a read instruction on the first interface; and
in response to receiving the read instruction, providing a read FLIT to the second interface, the read FLIT comprising:
a second header slot comprising read information for reading at least one second cache line on the second interface; and
at least three generic slots.

17. The conversion circuit of claim 16, the conversion circuit further configured to receive a second FLIT from the second interface, the second FLIT comprising:
a third header slot comprising read response information for the at least one second cache line;
a second metadata slot comprising second metadata associated with the at least one second cache line; and
at least two slots comprising second cache line chunks of one of the at least one second cache line.

18. The conversion circuit of claim 17, further configured to:
receive in the second metadata slot, at least one second metadata field, each of the at least one second metadata field corresponding to one of the at least one second cache line and comprising a corresponding valid bit; and
determine whether metadata in each of the at least one second metadata field is valid based on the corresponding valid bit.

19. The conversion circuit of claim 1, further integrated into a device selected from a group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

20. A method in a conversion circuit for providing a flow control unit (FLIT) to a link interface circuit in response to an instruction received on a first interface, the method comprising:
receiving the instruction comprising a write instruction and at least a first cache line; and
generating, on a second interface coupled to the link interface circuit, a FLIT comprising:
a first header slot comprising information of the at least one first cache line;
a first metadata slot comprising metadata associated with the at least one first cache line; and
at least two slots comprising bytes of the at least one first cache line.

* * * * *